United States Patent
Beyda et al.

(10) Patent No.: US 6,810,015 B1
(45) Date of Patent: Oct. 26, 2004

(54) APPARATUS AND METHOD FOR OPTIMIZING THE USE OF MULTIPLE GATEWAY IN TOL SYSTEMS

(75) Inventors: William Joseph Beyda, Cupertino, CA (US); Shmuel Shaffer, Palo Alto, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/419,821

(22) Filed: Oct. 15, 1999

(51) Int. Cl.[7] .............................................. H04L 12/66
(52) U.S. Cl. ....................... 370/235; 370/356; 370/390; 370/401; 370/432; 379/88.17; 379/220.01; 709/249
(58) Field of Search ................................. 370/231, 235, 370/259, 260, 352, 356, 389, 390, 400, 401, 432; 379/88.17, 93.07, 201, 202, 220.01, 265.01, 265.02, 265.09; 709/201, 203, 238, 249

(56) References Cited

U.S. PATENT DOCUMENTS

| | | | | |
|---|---|---|---|---|
| 6,006,253 A | * | 12/1999 | Kumar et al. ............... | 709/204 |
| 6,163,531 A | * | 12/2000 | Kumar ......................... | 370/260 |
| 6,229,804 B1 | * | 5/2001 | Mortsolf et al. ............. | 370/352 |
| 6,275,574 B1 | * | 8/2001 | Oran ........................... | 379/201 |
| 6,298,062 B1 | * | 10/2001 | Gardell et al. ............... | 370/401 |
| 6,324,279 B1 | * | 11/2001 | Kalmanek, Jr. et al. .... | 379/229 |
| 6,366,576 B1 | * | 4/2002 | Haga ........................... | 370/352 |
| 6,404,746 B1 | * | 6/2002 | Cave et al. .................. | 370/262 |
| 6,418,139 B1 | * | 7/2002 | Akhtar ........................ | 370/356 |
| 6,426,945 B1 | * | 7/2002 | Sengodan .................... | 370/238 |
| 6,490,275 B1 | * | 12/2002 | Sengodan .................... | 370/356 |
| 6,584,095 B1 | * | 6/2003 | Jacobi et al. ................ | 370/352 |
| 6,650,619 B1 | * | 11/2003 | Schuster et al. ............. | 370/230 |

* cited by examiner

Primary Examiner—Alpus H. Hsu

(57) ABSTRACT

A system and method for a gatekeeper (108) to multicast commands to all gateways (106) in the system. The gateways (106) listen for one of their peer gateways (106) to accept. If one accepts, then the other gateways ignore the pending call request. The gatekeeper (108) making the request can specify an order in which the gateways (106) are to respond to its request. The order may be based on a variety of factors, such as number of calls presently being handled by a particular gateway (106) or cost of calls. Further, the gateways (106) may be provided with timers to process a call request in the requested order if a gateway (106) earlier in the queue fails to respond.

17 Claims, 4 Drawing Sheets

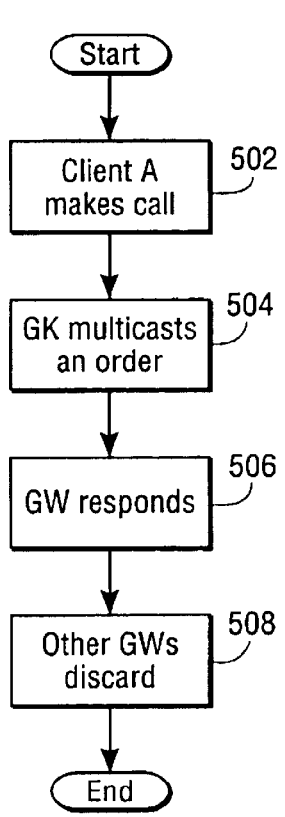
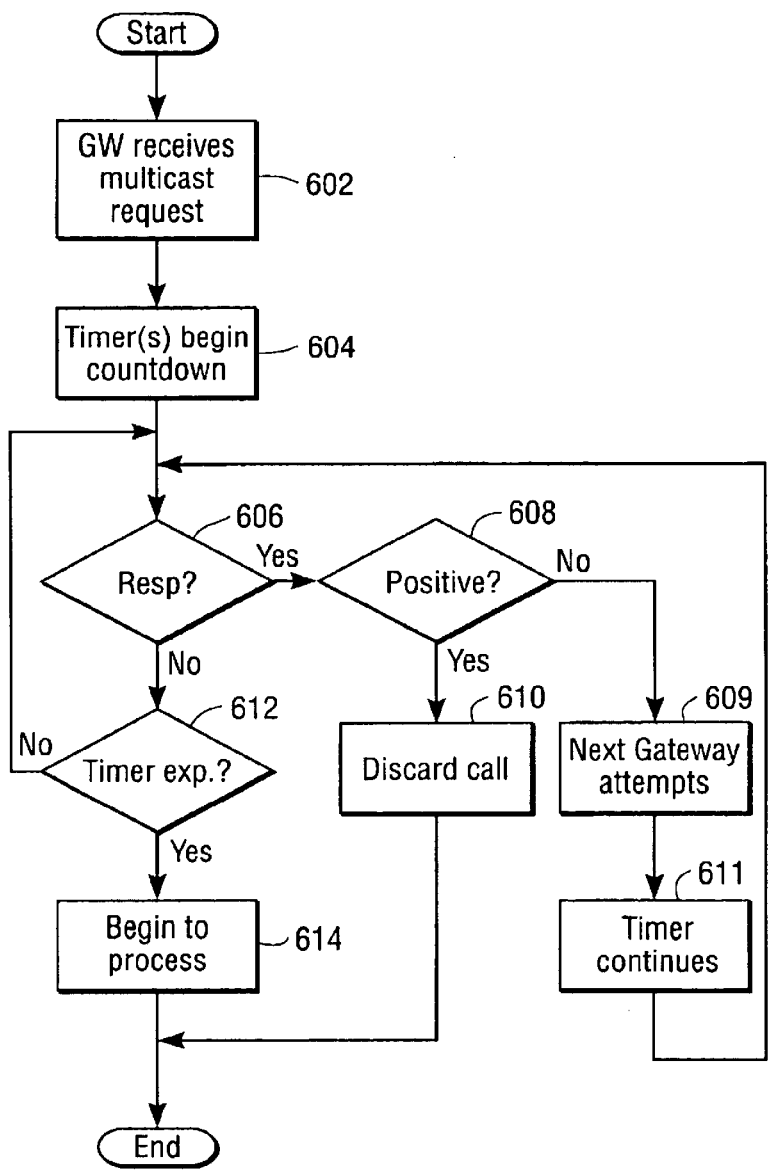
FIG. 5
FIG. 6

APPARATUS AND METHOD FOR OPTIMIZING THE USE OF MULTIPLE GATEWAY IN TOL SYSTEMS

BACKGROUND OF THE INVENTION

1. Field of the Invention

The present invention relates to telecommunication systems and, particularly, to an improved system and method for using multiple gateways in a telephony-over-LAN (ToL) system.

2. Description of the Related Art

The International Telecommunications Union (ITU) Recommendation H.323 describes a set of devices and protocols for multimedia communication over packet-switched networks (such as local area networks). The four main components defined by the Recommendation are clients, multipoint control units, gateways, and gatekeepers. H.323 endpoints include clients or terminals, and gateways. Multipoint control units are used for supervising calls involving multiple parties. Gatekeepers are used for performing switching and call management functions, and gateways are used for routing calls from the LAN to other networks, such as the public switched telephone network (PSTN).

Gateways and gatekeepers in modern telephony-over-LAN (ToL) systems, such as those described by the H.323 Recommendation, are often poorly synchronized when placing outgoing calls. A gatekeeper that wants to establish a call outside the ToL system conventionally sends a call request to the gateway to place the call. Since gateways are often limited in capacity, multiple gateways are often used. Conventionally, the gatekeeper tries to place a call on each gateway in turn with polling. If the gateway has an available line, the gateway responds affirmatively and makes the call. If not, the gateway responds negatively and the gatekeeper tries the next gateway. Under heavy load, the gatekeeper might try to place the call with multiple gateways before it finds one with an available line.

Conventional ToL systems are thus disadvantageous in that multiple attempts by the gatekeeper may be needed before a call is completed. Thus, conventional ToL systems can undesirably load the system with communications between the gatekeeper and the gateways.

SUMMARY OF THE INVENTION

These and other drawbacks in the prior art are overcome in large part by a system and method according to the present invention. Briefly, the present invention allows gatekeepers to multicast commands to all gateways in the system. The gateways listen for one of their peer gateways to accept. If one accepts, then the other gateways ignore the pending call request. The gatekeeper making the request can specify an order in which the gateways are to respond to its request. The order may be based on a variety of factors, such as number of calls presently being handled by a particular gateway. Further, the gateways may be provided with timers to process a call request in the requested order if a gateway earlier in the queue fails to respond.

A gatekeeper according to an embodiment of the invention includes a multicast control unit for multicasting call setup commands for calls external to the network to a plurality of gateways. The multicast call request can also include a preferred order of response from the gateways. The order may be determined in a variety of ways. For example, the gatekeeper may monitor the number of calls being handled by each gateway and may specify that the least busy gateway is to attempt setup first.

A gateway according to an embodiment of the invention includes a monitoring unit for monitoring multicast call requests and the status of other gateways as a multicast call request is processed. The monitors may include timers which cause the gateway to begin processing the call if a gateway earlier in the queue has failed to respond. If a call has been picked up for processing by another gateway, other gateways halt and drop the call request.

Thus, the present invention advantageously allows a single call request to be placed on the gateway and minimizes the likelihood of a busy gateway while reducing LAN traffic caused by unnecessary polling.

BRIEF DESCRIPTION OF THE DRAWINGS

A better understanding of the invention is obtained when the following detailed description is considered in conjunction with the following drawings in which:

FIG. 5 is a flowchart illustrating operation of one embodiment of the present invention;

FIG. 6 is a flowchart illustrating operation of one embodiment of the invention;

DETAILED DESCRIPTION OF THE INVENTION

FIGS. 1–8 illustrate an improved system and method for using multiple gateways in a telephony-over-LAN system. Briefly, the present invention allows gatekeepers to multicast commands to all gateways which listen for one of their peer gateways to accept. If one gateway accepts, then the other gateways ignore the pending call request. The multicast call request can also include a preferred order of response from the gateways.

Figure 1:
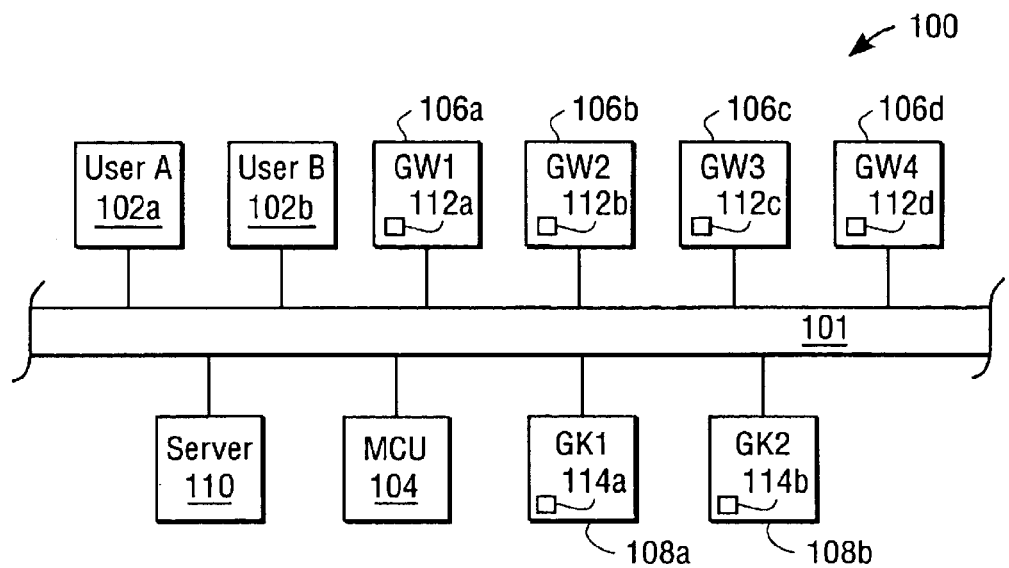
FIG. 1 is a block diagram of an exemplary telecommunications network according to an embodiment of the invention.

Turning now to the drawings, and with particular attention to FIG. 1, a diagram illustrating an exemplary H.323 telecommunications system 100 according to an embodiment of the present invention is shown. An exemplary generic H.323 system is the Siemens HiNet™ RC 3000 system available from Siemens. It is noted that, while described specifically in the context of voice packets, the present invention encompasses the use of any multimedia information, such as video, data, voice, or any combinations thereof. Moreover, it is noted that, while described specifically in the context of an H.323 network, the teachings of the present invention are applicable to any network which must interface with an external network. Thus, the figures are exemplary only.

As shown, the H.323 telecommunications system 100 includes a local area network (LAN) or packet network 101. Coupled to the LAN 101 may be a variety of H.323 terminals 102a, 102b, a multi-point control unit (MCU) 104, H.323 gateways 106a, 106b, 106c, 106d according to the present invention, H.323 gatekeepers 108a, 108b according to the present invention, a LAN server 110, and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

The gateways 106a–106d may each include monitoring units 112a–112d, respectively, for receiving out-of-network call setup multicast commands from the gatekeepers 108a, 108b, as will be explained in greater detail below. Similarly, the gatekeepers 108a, 108b may be provided with multicast control units 114a, 114b for multicasting call setup commands to the gateways. A multicasting technique mechanism similar to that existing for H.323 multipoint conferences may be employed.

Figure 2:
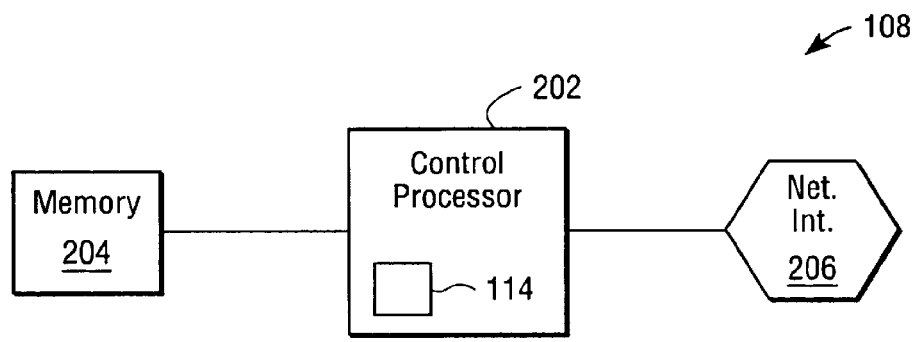
FIG. 2 is a block diagram of an exemplary gateway according to an embodiment of the invention.

FIG. 2 illustrates an exemplary gatekeeper 108 according to an embodiment of the invention. The gatekeeper 108 includes a control processor 202 for supervising operation of the gatekeeper 108, including, for example, supervising the switching of existing calls. The control processor 202 may be embodied as one or more microprocessor or microcontrollers and digital signal processors. Coupled to the control processor 202 is one or more memory devices 204 for storing program and system information. In particular, as will be discussed in greater detail below, the gatekeeper 108 stores information concerning the routing of existing calls. Also coupled to the control processor 202 is a network interface 206 for interfacing the gatekeeper 108 to the ToL network 101 (FIG. 1). Finally, the gatekeeper 108's control processor 202 may implement a multicast control unit 114 according to the present invention. The multicast control unit 114 may be embodied as software or firmware implementable by the control processor 202 or as a discrete unit. Thus, FIG. 2 is exemplary only. As will be explained in greater detail below, the multicast control unit 114 supervises multicasting call requests for calls external to the ToL network 101. The control processor 202 further stores in the memory 204 information concerning existing calls, such as which gateway is presently handling particular calls, as will be explained in greater detail below. Finally, in a multiple gatekeeper system, the control processor 202 also stores in the memory 204 information about calls being handled by the gateways that are routed through the other gatekeepers.

Figure 3:
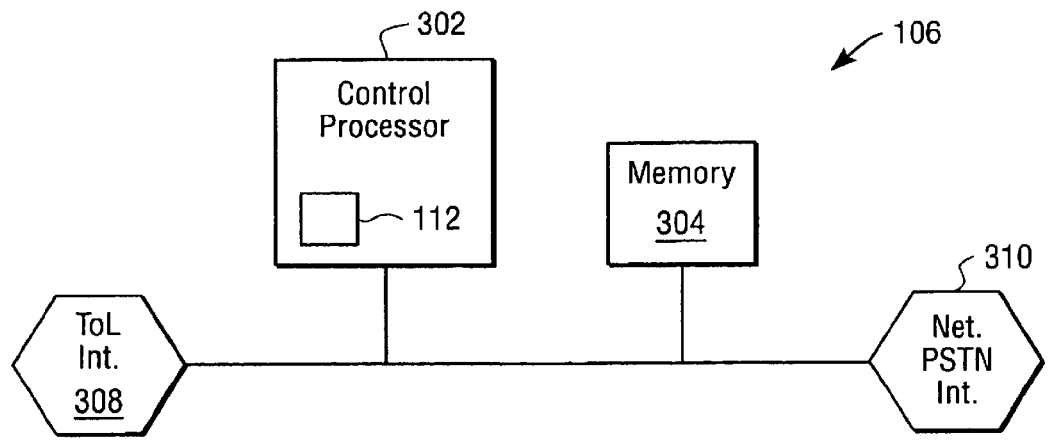
FIG. 3 is a block diagram of an exemplary gatekeeper according to an embodiment of the invention.

FIG. 3 illustrates an exemplary gateway 106 according to an embodiment of the invention. The gateway 106 includes a control processor 302 for supervising operation of the gateway 106. For example, the control processor 106 is responsible for switching data streams from the ToL network to the public switched telephone network. The control processor 302 is implementable as one or more microprocessors or microcontrollers and digital signal processors. One or more memory devices 304 may be provided for storing program and system information. The gateway 106 further includes a ToL network interface 308, and a PSTN interface 310. Finally, the gateway 106's control processor 302 may include a monitoring unit 112 according to the present invention. As will be explained in greater detail below, the monitoring unit 112 monitors the ToL network and other gateways in the system for handling of multicast call requests sent from the gatekeeper(s). The monitoring unit 112 may be embodied as software or firmware implementable by the control processor 302 or as a discrete unit. Thus, FIG. 3 is exemplary only.

Figure 4:
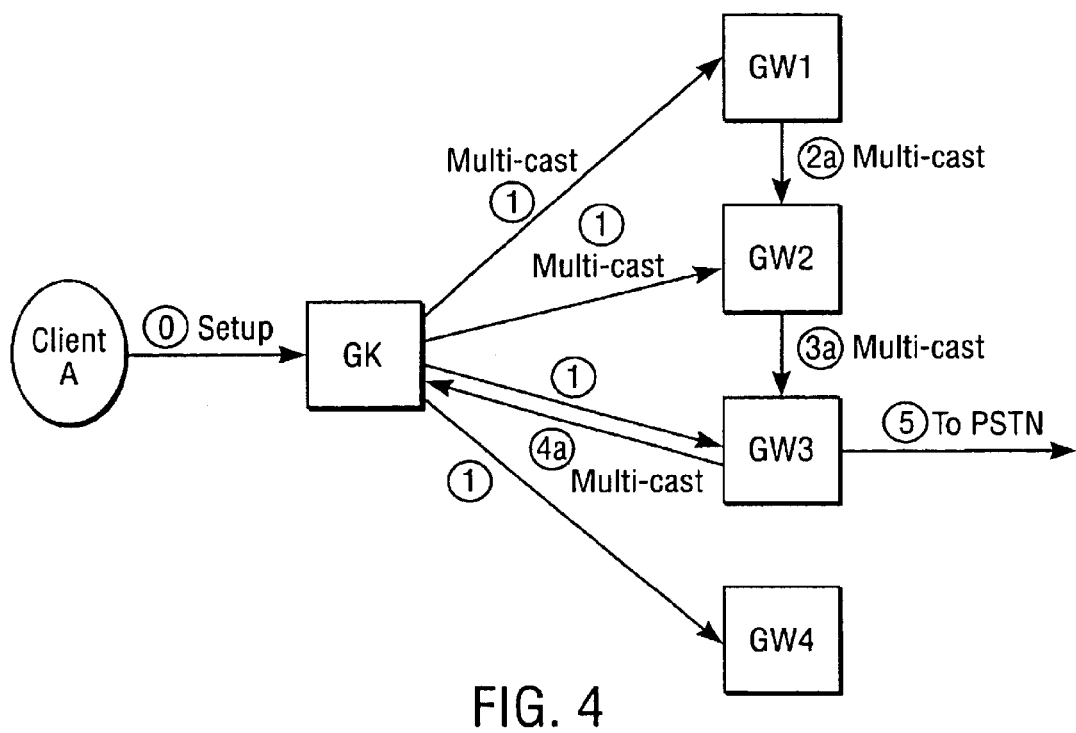
FIG. 4 is a signal flow diagram according to an embodiment of the invention.

Operation of an embodiment of the present invention may be understood by way of example with reference to the signal diagram of FIG. 4 and the flowchart of FIG. 5. Shown schematically in FIG. 4 are a H.323 client terminal Client A, a gatekeeper GK and four gateways GW1–GW4. Initially, in a step 502 (FIG. 5), Client A requests a call to a party external to the network. The gatekeeper GK receives the call request and identifies the call request as relating to a call external to the network. In a step 504, the gatekeeper GK, and, particularly, its multicast control unit 114, multicasts the call request to the gateways GW1–GW4. As will be discussed in greater detail below, this multicast call request can include a preferred gateway order for processing the call. The multicast call request with the preferred order is received by the gateways' monitoring units. In the example of FIG. 4, the order is GW1, GW2, GW3, GW4. As shown in FIG. 4, the gateway GW1 determines it cannot handle the call and may provide a multicast control signal to the other gateways (in particular their monitoring units) indicative of this failure. The next gateway in the preferred order queue, GW2, then attempts to process the call. Again, if the gateway GW2 is unable to process the call, it provides a multicast control signal indicative of this failure to other gateways (their monitoring units). Alternatively, as will be explained in greater detail below, if the gateway GW2 is down and cannot send a failure signal, a timer on the gateway GW3's monitoring unit may expire, causing the gateway GW3 to begin processing the call.

Thus, in a step 506, a gateway (GW3) finally responds to handle the call. The gateway GW3 then begins to process the call in the standard fashion. In a step 508, the other (remaining) gateways, in this example, the gateway GW4, discard the call request, as a result of receiving a multicast signal indicative of success from GW3. The gateway GW3 sends a signal back to the gatekeeper GK indicating that it is handling the call. The gatekeeper and the gateway GW3 then set up the call using, for example, standard H.323 call setup procedures.

Operation of another embodiment of the invention is illustrated with reference to the flowchart of FIG. 6. In particular, FIG. 6 illustrates timer handling by the gateways' monitoring units. In a step 602, the gateways, and particularly, their monitoring units 112, receive the multicast call setup request from the gatekeeper GK. The gateways also receive the preferred order of gateway response, which sets off the timers, in a step 604. The timers begin a countdown of time A*X, where A is a predetermined constant, and X is the order in which each gateway is to process the call request. In a step 606, the monitoring units 112, and particularly, the monitoring unit of the next gateway, monitor whether there has been a response from a gateway earlier in the queue. If not, and the gateway's timer expires, as determined in a step 612, then in a step 614, that gateway begins to process the call. Otherwise, the gateway continues to monitor whether there has been a positive response from a prior gateway. If, in step 608, there had been a response from a gateway and the call was processed earlier in the queue, then in a step 610, the call is discarded by subsequent gateways. Otherwise, the next gateway in the queue will begin processing the call in a step 609, and the timers on the next gateways will continue, in a step 611.

Figure 7:
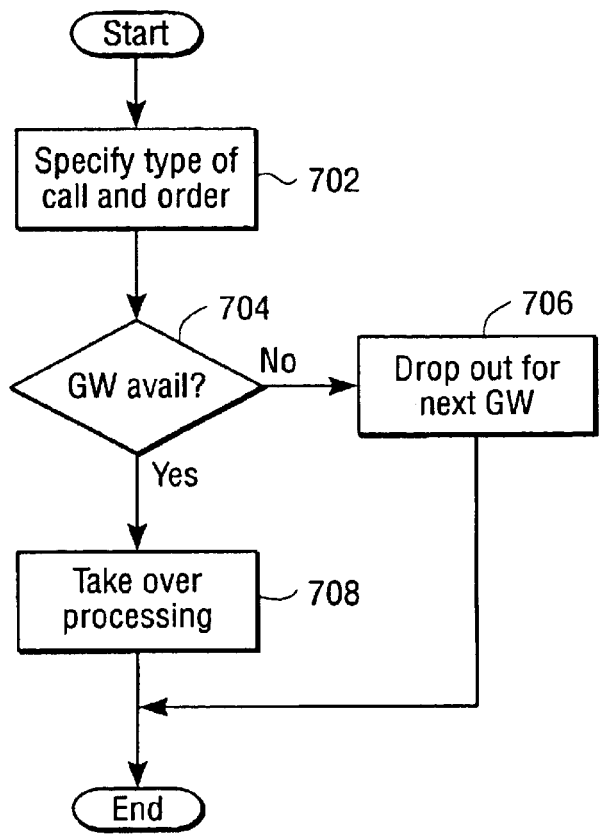
FIG. 7 is a flowchart illustrating operation of one embodiment of the invention.

As discussed above, a variety of methods for determining the order of gateway processing may be used. Turning now to FIG. 7, a flowchart illustrating one method of determining call setup processing ordering according to an embodiment of the invention is shown. In particular, FIG. 7 illustrates call setup process ordering where the gatekeeper can specify the type of call which is to be handled. In this manner, the gatekeeper GK can supervise and optimize the cost of the call. In a step 702, the gatekeeper GK multicasts the call setup to the gateways GW1–GW4. The call setup identifies the type of call, such as local, long distance, international, etc. In a step 704, the first gateway GW1 in the queue will determine whether it has an outgoing line of that type available. If so, then it will attempt to set up the call, in a step 708. Otherwise, in a step 706, the gateway GW1 will drop out of the queue and issue a multicast signal indicating that the next available gateway (GW2) in the queue is to attempt processing.

Figure 8:
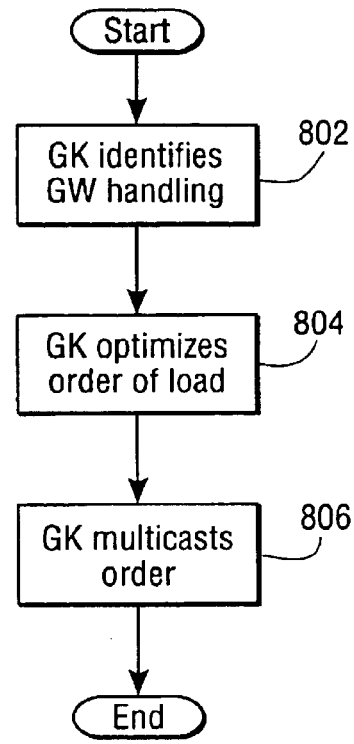
FIG. 8 is a flowchart illustrating operation of one embodiment of the invention.

As noted above, a variety of ordering methods may be employed. Another such method is illustrated with reference to FIG. 8. In particular, the flowchart of FIG. 8 illustrates the gatekeeper identifying the load on various gateways. Once the gatekeeper GK receives a setup request for a call to an external network from the client endpoint, the gatekeeper in a step 802 accesses its database of calls to determine gateway handling of calls. For example, the gatekeeper will monitor which gateways are handling its outgoing calls. Similarly, to account for incoming calls, the gatekeeper may assume that the central office (not shown) will send the next incoming call to the next free line in a predetermined sequence and that that line is therefore busy. In a step 804, the gatekeeper optimizes the order of the gateways in terms of their load. In a step 806, the gatekeeper multicasts the call request, with the order of processing specified according to level of load on the gateways.

It is noted that, in embodiments employing more than one gatekeeper, the extra gatekeeper(s) themselves monitor the multicast signals sent to and returned from the gateways. Thus, the additional gatekeepers maintain a database in their memory units of the total number of calls being handled by the gateways so that they can more optimally order the gateway processing sequence queue.

What is claimed:

1. A telecommunications system, comprising:
    a network;
    one or more gatekeepers coupled to said network; and
    a plurality of gateways coupled to said network and configured to interface said network to one or more eternal networks;
    wherein said one or more gatekeepers are configured to multicast call set up messages to said a plurality of gateways when a call is to be made to one or more external networks, said multicast call setup messages comprising a single call set up message sent to multiple gateways.

2. A telecommunications network according to claim 1, wherein said one or more gatekeepers are configured to specify an order in which said one or more gateways are to process said multicast call set up messages.

3. A telecommunications network according to claim 2, wherein said order is based on gateway load.

4. A telecommunications network according to claim 3, wherein said gateway load accounts for a next incoming line which will be used for a next incoming call.

5. A telecommunication system according to claim 4, wherein said one or more gatekeepers monitor calls being handled by others of said one or more gatekeepers to determine a level of load on said gateways.

6. A telecommunications system according to claim 1, wherein said one or more gateways include one or more timers for determining a time to begin processing said multicast call set up request if a gateway higher in a queue has not responded.

7. A telecommunications gateway coupled between a first network to a second network, comprising:
    a first network interface;
    a second network interface; and
    a control processor, said control processor configured to receive multicast call set up requests from gatekeepers on said first network to destinations on said second network, said multicast call set up requests being directed to said telecommunications gateway and other telecommunications, gateways coupled between said first network and said second network, said multicast call setup requests comprising single call setup messages sent to multiple gateways, and specifying an order in which said telecommunications gateway and said other telecommunications gateways should attempt to process said call set up request, said control processor configured to process said call set up requests if another of said other telecommunications gateways higher in said order does not process said multicast call set up request.

8. A telecommunications gateway according to claim 7, further including a timer, said timer counting down a time at the end of which said control processor attempts to process said call set up request if another of said other telecommunications gateways higher in said order does not respond to said multicast call set up request.

9. A telecommunications gateway according to claim 8, said control processor configured to ignore said multicast call set up request if another of said other telecommunications gateways has processed said call set up request.

10. A telecommunications gatekeeper in a packet network, comprising:
    a network interface; and
    a multicast control unit configured to multicast call set up commands to one or more gateways coupled to said packet network and adapted to interface said packet network to a same one or more external networks, said multicast call setup commands comprising a single call set up message sent to multiple gateways, said call set up commands indicative of calls external to said packet network;
    wherein said multicast control unit is configured to provide to said one or more gateways an order in which said one or more gateways should attempt to process said multicast call set up commands.

11. A telecommunications gatekeeper according to claim 10, wherein said order is an order that minimizes a cost of said call.

12. A telecommunications gatekeeper according to claim 10, wherein said order is an order that minimizes load on said gateways.

13. A telecommunications method, comprising:
    multicasting a call setup request from a gatekeeper to a plurality of gateways, said gatekeeper coupled to a first network and said plurality of gateways coupled to interface said first network to one or more second networks, said call setup request specifying an order in which said plurality of gateways should attempt to process said call setup request; and
    processing said call setup request at one of said plurality of gateways.

14. A telecommunications method according to claim 13, further comprising said gatekeeper determining said order based on a level of load at said plurality of gateways.

15. A telecommunications method according to claim 14, wherein said gateway load accounts for a next incoming line which will be used for a next incoming call.

16. A telecommunications method according to claim 14, wherein said gatekeeper determines said load by monitoring calls placed with said plurality of gateways by other gatekeepers.

17. A telecommunications method according to claim 13, wherein said order is based on whether one of said plurality of gateways has a line of a particular type available.

* * * * *